US012765551B2

(12) United States Patent
Kirkwood et al.

(10) Patent No.: US 12,765,551 B2
(45) Date of Patent: Oct. 20, 2026

(54) ANTIMICROBIAL COMPOSITION COMPRISING A MODIFIED ALKYL GLYCOSIDE AND AN ALKANEDIOL

(71) Applicant: The Procter & Gamble Company, Cincinnati, OH (US)

(72) Inventors: Kathleen Kirkwood, Newcastle (GB); Eva Maria Perez-Prat Vinuesa, Vinhedo (BR)

(73) Assignee: The Procter & Gamble Company, Cincinnati, OH (US)

( * ) Notice: Subject to any disclaimer, the term of this patent is extended or adjusted under 35 U.S.C. 154(b) by 423 days.

(21) Appl. No.: 18/481,266

(22) Filed: Oct. 5, 2023

(65) Prior Publication Data

US 2024/0114906 A1 Apr. 11, 2024

(30) Foreign Application Priority Data

Oct. 5, 2022 (EP) .................................... 22199783
Jun. 26, 2023 (EP) .................................... 23181544
Oct. 4, 2023 (CA) ................................ CA 3215446

(51) Int. Cl.
*A01N 43/16* (2006.01)
*A01N 31/02* (2006.01)
*A01P 1/00* (2006.01)

(52) U.S. Cl.
CPC ............. *A01N 43/16* (2013.01); *A01N 31/02* (2013.01); *A01P 1/00* (2021.08)

(58) Field of Classification Search
CPC ............ A61N 43/16; A61N 31/02; A09P 1/00
See application file for complete search history.

(56) References Cited

U.S. PATENT DOCUMENTS 7,414,016 B1 8/2008 Van Buskirk et al.
7,470,331 B1 12/2008 Van Buskirk et al.
2007/0265352 A1* 11/2007 Roeding ................ A23B 2/742 514/738
2011/0206790 A1 8/2011 Weiss
2014/0140936 A1 5/2014 Cusack et al.
2015/0099638 A1 4/2015 Cochran et al.
2017/0172145 A1 6/2017 Sherry
2018/0371376 A1 12/2018 Hayward
2019/0330564 A1 10/2019 Ceulemans
2019/0330567 A1 10/2019 Ceulemans

FOREIGN PATENT DOCUMENTS

CN 105769717 A 7/2016
CN 111249217 A 6/2020
EP 3078365 A1 10/2016
WO 2021062404 A1 4/2021
WO 2022024087 A1 2/2022

OTHER PUBLICATIONS

All Office Actions: U.S. Appl. No. 18/481,265, filed Oct. 5, 2023.
Extended EP Search Report and Opinion for 22199783.6 dated Mar. 2, 2023, 19 pages.
Colonial Chem: "suga® Nate 160NC Technivcal Datasheef, XP055731425, URL Link—https://www.colonialchem.com/fullpanel/uploads/files/suganate-160nc-tds-5-20.pdf", dated Feb. 2, 2018, 4 pgs.
Green J S et al: "Understanding over-the-counter medications and prescription devices for eczema: Potential consequences for consumers",XP027499068 Journal of the American Academy of Dermatology, vol. 63, No. 6, (dated Dec. 1, 2010), pp. 1094-1098.
Unpublished U.S. Appl. No. 18/481,265, filed Oct. 5, 2023, Kathleen Kirkwood et al.
"Database GNPD Mintel;, anonymous: Bouncy Skin Kit, XP055754204, Database accession No. 7904205", dated Jun. 23, 2020, 5 pgs.
Extended EP Search Report and Search Opinion for 23181544.0 dated Feb. 6, 2024, 10 pages.
"Suga® Boost 050", Colonial Chemical, Safety Data Sheet, Retrieved from Internet: https://colonialchemical-sds.thewercs.com/External/Results?searchKey=Main#, XP093382609, Apr. 15, 2024, 8 pages.
"Suga® Boost 30", Colonial Chemical, Safety Data Sheet, Retrieved from Internet: https://colonialchemical-sds.thewercs.com/External/Results?searchKey=Main#, XP093382638, May 23, 2024, 9 pages.
Sun Andy et al. "Suga® Boost—High Performance Natural Surfactant Series", Retrieved from Internet: https://www.colonialchem.com/wp-content/uploads/2020/11/sugaboost-presentation-4-1-2020-webinar.pdf, XP093382538, Nov. 1, 2020, pp. 1-25.

* cited by examiner

*Primary Examiner* — Layla D Berry
(74) *Attorney, Agent, or Firm* — Gary J. Foose

(57) ABSTRACT

An antimicrobial composition including from 1 to 10% by weight of the composition of a modified alkyl glycoside having an alkyl glycoside and a modifying moiety wherein the modifying moiety has a functional group selected from the group consisting of sulfonate, carboxylate, glycinate, carboxymethyl, hydroxyalkyl and a mixture thereof; and/or wherein the modified alkyl glycoside is a sorbitan alkyl glucoside polymer; and a 1,2-alkanediol having from 6 to 12 carbon atoms; with the proviso that the modified alkyl polyglucoside is not hydroxypropylsulfonate laurylglucoside cross polymer.

16 Claims, No Drawings

ANTIMICROBIAL COMPOSITION COMPRISING A MODIFIED ALKYL GLYCOSIDE AND AN ALKANEDIOL

FIELD OF THE INVENTION

The present invention is in the field of antimicrobial compositions. In particular, it relates to a composition comprising a modified alkyl glycoside and an alkanediol.

BACKGROUND OF THE INVENTION

A dichotomy exists. Compositions that provide good cleaning and shine not always provide good sanitization and compositions that provide good sanitization may leave streaks and lack of shine on surfaces. This is more accentuated in the case of compositions that provide residual sanitization. The purpose of the present invention is to provide a composition that cleans, provides shine and at the same time good sanitization. It is also a purpose of the present invention to provide a composition that is environmentally friendly and mild to the skin, and eyes.

SUMMARY OF THE INVENTION

According to the first aspect of the invention there is provided a composition comprising a modified alkyl glycoside and an alkanediol. The composition comprises:

i) from 1 to 10% by weight of the composition of a modified alkyl glycoside, the modified alkyl glycoside comprises an alkyl glycoside and a modifying moiety, the modifying moiety comprises a functional group, the functional group is selected from the group consisting of sulfonate, carboxylate, glycinate, carboxymethyl, hydroxyalkyl and a mixture thereof; and/or the modified alkyl glycoside is a sorbitan alkyl glucoside polymer; and ii) a 1,2-alkanediol having from 6 to 12 carbon atoms;

Preferably, the composition is substantially free of hydroxypropylsulfonate laurylglucoside cross polymer.

The composition provides good cleaning, shine and antibacterial properties. The composition is environmentally friendly and mild to the skin and eyes.

According to the second aspect of the invention there is provided a method to provide residual biocidal activity to an inanimate surface using a composition comprising a modified alkyl glycoside and a 1,2-alkanediol.

The elements of the composition described in relation to the first aspect of the invention apply mutatis mutandis to the second aspect of the invention.

DETAILED DESCRIPTION OF THE INVENTION

The present invention encompasses an antimicrobial composition. The composition comprises a modified alkyl glycoside and an alkanediol. The composition is preferably in liquid form. The composition presents a lot of flexibility regarding pH, it can be alkaline or acidic. Preferably, the composition is substantially free of quaternary ammonium compounds. By "substantially free" of a compound is herein meant that the composition comprises less than 0.001% by weight of the composition of the compound.

The composition of the invention is well suited to be used to treat hard surfaces and fabrics. The composition is preferably a liquid composition, more preferably an aqueous liquid composition comprising at least 50% by weight of the composition of water. The composition may comprise from 80% to 99.5% by weight of the total composition of water, preferably from 82% to 98% and more preferably from 85% to 97%.

By "hard surface" it is meant herein hard surfaces found in households, especially domestic households. Surfaces to be cleaned include kitchens and bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, steel, kitchen work surfaces, any plastics, plastified wood, metal or any painted or varnished or sealed surface and the like. Household hard surfaces also include household appliances including, but not limited to refrigerators, freezers, washing machines, automatic dryers, ovens, microwave ovens, dishwashers and so on. Such hard surfaces may be found both in private households as well as in commercial, institutional and industrial environments.

The composition of the invention is also suitable to be used on fabrics, either directly, by for example spraying the composition onto the fabric, or in a washing machine during the pre-wash, main wash and/or any of the rinses.

The compositions of the present invention preferably can be a non-thickened liquid, or water like, having a viscosity of from 1 mPa·s to 20 Pa·s, or can be thickened, having a viscosity of from 50 Pa·s to 1200 Pa·s, more preferably 100 Pa·s to 800 Pa·s, most preferably 200 Pa·s to 600 Pa·s when measured at 20° C. with a AD1000 Advanced Rheometer from Atlas® shear rate 10 $s^{-1}$ with a coned spindle of 40 mm with a cone angle 2° and a truncation of ±60 μm.

All percentages, ratios and proportions used herein are by weight percent of the composition, unless otherwise specified. All average values are calculated "by weight" of the composition, unless otherwise expressly indicated. All ratios are calculated as a weight/weight level, unless otherwise specified.

The singular forms as used herein can include the plural, equally the plural can include the singular unless the content indicates otherwise, for example "a", "an" and "the", can include the plural referents unless the content indicates otherwise.

All measurements are performed at 25° C. unless otherwise specified.

Unless otherwise noted, all component or composition levels are in reference to the active portion of that component or composition, and are exclusive of impurities, for example, residual solvents or by-products, which may be present in commercially available sources of such components or compositions.

As used herein, the terms "microbe" or "microbial" should be interpreted to refer to any of the microscopic organisms studied by microbiologists or found in the use environment of a treated article. Such organisms include, but are not limited to, bacteria and fungi as well as other single-celled organisms such as mould and algae. Viral particles (i.e., enveloped and non-enveloped viruses) and other infectious agents are also included in the term microbe.

"Antimicrobial" further should be understood to encompass both microbicidal and microbiostatic properties. That is, the term encompasses microbe killing, leading to a reduction in number of microbes, as well as a retarding effect of microbial growth, wherein numbers may remain more or less constant (but nonetheless allowing for slight increase/decrease).

For ease of discussion, this description uses the term antimicrobial to denote a broad-spectrum activity (e.g., against bacteria, viruses and fungi). When speaking of efficacy against a particular microorganism or taxonomic rank, the more focused term will be used (e.g., antifungal to denote efficacy against fungal growth in particular). Using the above example, it should be understood that efficacy against fungi does not in any way preclude the possibility that the same antimicrobial composition may demonstrate efficacy against another class of microbes.

Residual biocidal properties refer to achieving at least 99.9% microbial reduction in the Environmental Protection Agency (EPA)-approved 24 hour Residual Self Sanitizing (RSS) test methodology for dried product residues on hard, non-porous surfaces (EPA Protocol #01-1A). That is, the compositions of the invention displaying residual biocidal properties are able to deliver at least 99.9% microbial reduction after a 12-abrasion and 5-reinoculation 24 hour testing regime.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.) and branched-chain alkyl groups (e.g., isopropyl, tert-butyl, sec-butyl, isobutyl, etc.).

Antimicrobial Composition

The present invention is directed to an antimicrobial composition. The composition comprises a modified alkyl glycoside and an alkanediol.

Modified Alkyl Glycoside

By "modified alkyl glycoside" is herein meant a molecule comprising an alkyl glycoside and/or an alkyl polyglycoside and an additional moiety.

The alkyl glycoside is modified by the addition of a moiety, preferably the modification takes place in one of the —OH groups of the glycoside. The modification of the alkyl glycoside can be made by any known method that allows bonding of the moiety to the alkyl glycoside, for example, the modification can be done by addition reaction, including hydrolysis, polymerization, etc.

Preferably, the moiety comprises a functional group selected from the group consisting of sulfonate, carboxylate, glycinate, carboxymethyl, hydroxyalkyl and a mixture thereof, more preferably from the group consisting of sulfonate, carboxylate, in particular citrate, glycinate, carboxymethyl, hydroxyalkyl and a mixture thereof.

Preferably, the glycoside is a glucoside or a polyglucoside. Preferably, the alkyl chain of the alkyl glycoside comprises from 6 to 16, preferably from 8 to 14 and more preferably from 10 to 12 carbon atoms. The chain can be linear or branched, preferably, the alkyl chain is linear. Alkyl glucoside with an alkyl chain of 10 or 12 carbon atoms are preferred for use herein.

Preferred alkyl glucosides for use herein include disodium laurylglucoside hydroxypropyl citrate, sodium laurylglucosides hydroxypropylsulfonate, sorbitan oleate decylglucoside polymer, sodium bis-hydroxyethylglycinate lauryl-glucoside or coco-glucoside polymer and mixtures thereof.

The modified alkyl glycosides of the composition of the present invention are preferably alkyl glucosides or polyglucosides. The modified alkyl glycosides of the present invention may comprise one or more glucose units, i.e. may be alkyl monoglucosides and alkyl polyglucosides. Suitable alkyl glucosides include sugar-derived biodegradable surfactants with high natural product content, free of ethoxylation, ethylene oxide, and 1,4-dioxane.

Suitable modified alkyl polyglucoside surfactants include sulfonate modified alkyl polyglucosides such as for example sodium alkylglucosides hydroxypropylsulfonate CAS #742087-49-6 (U.S. Pat. Nos. 6,627,612, 8,071,520); citrate modified alkyl polyglucoside surfactants such as for example disodium laurylglucosides hydroxypropyl citrate CAS #2481100-10-9; glycinate and polyglycinate modified alkyl polyglucoside an example of which are sodium bis-hydroxyethylglycinate coco-glucosides polymer and sodium bis-hydroxyethylglycinate lauryl-glucosides polymer; betaine modified alkyl polyglucosides, such as a C12 betaine modified alkyl polyglucoside, a C12-C14 blend of a betaine modified alkyl polyglucoside or a C14 betaine modified alkyl polyglucoside (U.S. Pat. No. 8,299,009); sorbitan oleate decylglucoside polymer CAS #1443994-56-6 (U.S. Pat. No. 8,268,766) and a mixture thereof. These modified alkyl polyglucosides are commercially available by Colonial Chemical, Inc. under the Poly Suga® and Suga® trade names.

Preferred modified alkylpolyglucosides include sulfonate modified alkylpolyglucosides such as sodium alkylglucosides hydroxypropylsulfonate CAS #742087-49-6; citrate modified alkylpolyglucosides such as for example disodium laurylglucosides hydroxypropyl citrate CAS #2481100-10-9; sorbitan oleate decylglucoside polymer CAS #1443994-56-6; and mixtures thereof. These modified alkyl polyglucosides are commercially available by Colonial Chemical Inc under the name of Suga®Nate, Suga®Citrate and Poly Suga®Mulse respectively.

Preferred mixtures of modified alkylpolyglucoside comprise a sorbitan oleate decylglucoside polymer and one or more modified alkyl polyglucosides selected from the group consisting of a carboxymethyl modified alkyl polyglucoside, a polycarboxylate modified alkyl olyglucoside, a sulfonate modified alkyl polyglucoside, a glycinate modified alkyl polyglucoside, a polyglycinate modified alkyl polyglucoside, a citrate modified alkyl polyglucoside, and a polycitrate modified alkyl polyglucoside. The mixture may further comprise a non-modified alkyl polyglucoside.

More preferred mixtures of modified alkylpolyglucosides comprise a sorbitan oleate decylglucoside polymer, a sodium laurylglucoside hydroxypropylsulfonate surfactant, a sodium decylglucoside hydroxypropylsulfonate surfactant and mixtures thereof.

The modified alkylpolyglucosides of the composition of the present invention may comprise a monosaccharide unit, and a disaccharide unit.

The modified alkylpolyglucosides may comprise a linker, including a hydroxypropyl linker and a functionalizing agent as described in patent application WO2021062404.

Particularly preferred modified alkylpolyglucoside blend is commercialized under the name of Suga®Boost 050 by Colonial Chemical, Inc.

The composition may comprise from about 1% to about 10%, preferably from about 0.25 to about 5%, more preferably from about 0.4% to about 4% and even more preferably from about 0.5% to about 3.5% by weight of the composition of a modified alkyl polyglucoside or a modified alkyl polyglucoside blend.

These modified alkyl glucosides and blends thereof are found to be very effective in combination with selected alkanediols to deliver antimicrobial compositions even if the compositions are substantially free of quaternary ammonium compounds. The compositions show very high antimicrobial efficacy, including long lasting 24 hours residual efficacy, deliver good cleaning and shine end results, are not irritant to skin and eyes, and are environmentally friendly. It has surprisingly been found that specific combination of these environmentally friendly, naturally derived surfactant with different 1,2-alkanediols deliver very high antimicrobial efficacy. The modified alkyl polyglucoside is not hydroxypropylsulfonate laurylglucoside cross polymer. The composition of the invention is free of hydroxypropylsulfonate laurylglucoside cross polymer.

Alkanediol

The composition comprises an alkanediol. The composition preferably comprises from about 0.1% to about 10%, preferably from about 0.2% to about 6%, more preferably from about 0.3% to about 34% by weight of the composition of a 1,2 alkanediol that acts as antimicrobial agent. Preferably, the 1,2 alkanediol has from 6 to 12 carbon atoms. More preferably, the 1,2 alkanediol is selected from the group consisting of, 1,2-hexanediol, 1,2-heptanediol, 1,2-octanediol, 1,2-nonanediol, 1,2-decanediol, 1,2-undecanediol, 1,2-dodecanediol, and a mixture thereof. 1,2-hexanediol, 1,2-octanediol, 1,2-decanediol, and mixtures thereof are preferred for use in the composition of the invention. 1,2-hexanediol is specially preferred for use in the composition of the invention.

Compositions comprising 1,2-hexanediol, 1,2-octanediol, preferably in a weight ratio of from 1:2 to 1:4 have been found to perform very well.

Additional Ingredients

Surfactants

The antimicrobial composition may comprise from about 0.025% to about 3%, preferably from about 0.05% to about 2.5%, more preferably from about 0.1% to about 2% of an additional surfactant selected from the group consisting of anionic surfactants, non-ionic surfactants, zwitterionic surfactants, amphoteric surfactants, cationic surfactants and mixtures thereof. Preferably the additional surfactant is selected form the group consisting of anionic surfactants, non-ionic surfactants, zwitterionic surfactants, amphoteric surfactants, and mixtures thereof.

The anionic surfactant can be selected from the group consisting of alkyl sulphate, alkyl alkoxylated sulphate; alkyl benzene sulphonic acid and alkyl benzene sulphonate surfactants; polycarboxylated anionic surfactants; anionic surfactants derived from amino acids; and mixtures thereof.

The composition may comprise a non-ionic surfactant, suitable non-ionic surfactants include alcohol alkoxylated nonionic surfactants according to the formula RO-(A)nH, wherein: R is a primary C4 to C18, preferably a C6 to C16, more preferably a C6 to C14 branched or linear alkyl chain, or a C6 to C28 alkyl benzene chain; A is an ethoxy or propoxy or butoxy unit, or mixtures thereof, and wherein n is from 1 to 30, preferably from 1 to 15, more preferably from 3 to 12 even more preferably from 3 to 8. Preferred R chains for use herein are the C6 to C16 linear or branched alkyl chains.

The composition may comprise a non-functionalized alkyl polyglycoside surfactant. Alkyl polyglycosides are biodegradable nonionic surfactants which are well known in the art and can be used in the compositions of the present invention. Suitable alkyl polyglycosides can have the general formula CnH2n+1O(C6H10O5)xH wherein n is preferably from 8 to 16, more preferably 8 to 14, and x is at least 1. Examples of suitable alkyl polyglucoside surfactants are the TRITON™ alkyl polyglucosides from Dow; Agnique PG, Disponil APG and Glucopon alkyl polyglucosides from BASF. Preferred alkyl polyglucoside surfactants are those where n is 8 to 12, more preferably 8 to 10, such as for example Triton™ CG50 (Dow).

The composition may comprise and additional amine oxide surfactant. Suitable amine oxide surfactants include: R1R2R3NO wherein each of R1, R2 and R3 is independently a saturated or unsaturated, substituted or unsubstituted, linear or branched hydrocarbon chain having from 1 to 30 carbon atoms. Preferred amine oxide surfactants are amine oxides having the following formula: R1R2R3NO wherein R1 is a hydrocarbon chain comprising from 1 to 30 carbon atoms, preferably from 6 to 20, more preferably from 8 to 16 and wherein R2 and R3 are independently saturated or unsaturated, substituted or unsubstituted, linear or branched hydrocarbon chains comprising from 1 to 4 carbon atoms, preferably from 1 to 3 carbon atoms, and more preferably are methyl groups. R1 may be a saturated or unsaturated, substituted or unsubstituted linear or branched hydrocarbon chain.

The composition may comprise an alkyl glucamide surfactant as additional surfactant. Glucamide surfactants are non-ionic surfactants in which the hydrophilic moiety (an amino-sugar derivative) and the hydrophobic moiety (a fatty acid) are linked via amide bonds. This results in a chemical linkage, which is highly stable under alkaline conditions.

The composition may comprise an amphoteric surfactant, a zwitterionic surfactant, and mixtures thereof. Suitable zwitterionic surfactants typically contain both cationic and anionic groups in substantially equivalent proportions so as to be electrically neutral at the pH of use, and are well known in the art. Suitable zwitteronic surfactants include betaines such alkyl betaines, alkylamidobetaine, amidazoliniumbetaine, sulfobetaine (INCI Sultaines) as well as the phosphobetaine.

Chelating Agent

The antimicrobial cleaning composition may comprise a chelating agent. Suitable chelating agents, in combination with the surfactant system, improve the shine benefit. Chelating agent can be incorporated into the compositions in amounts ranging from about 0.05% to about 5.0% by weight of the composition, preferably from about 0.1% to about 3.0%, more preferably from about 0.2% to about 2.0% and most preferably from about 0.2% to about 0.4% by weight of the composition.

Preferred chelating agents are biodegradable. A preferred biodegradable chelating agent for use herein is ethylene diamine N,N'-disuccinic acid, or alkali metal, or alkaline earth, ammonium or substitutes ammonium salts thereof or mixtures thereof, for instance, as described in US patent 4, 704, 233. More preferred biodegradable chelating agents are L-glutamic acid N,N-diacetic acid (GLDA) commercially available under tradename Dissolvine 47S from Akzo Nobel, methyl glycine diacetic acid (MGDA), propylene diamine tetracetic acid (PDTA) which is, for instance, commercially available from BASF under the trade name Trilon FS. These biodegradable chelating agents can be used both in their acid form, or in their alkali metal, ammonium, and substituted ammonium salt forms.

The chelating agent maybe a polycarboxylate, suitable polycarboxylates include itaconic acid and sodium polyitaconate which is, for instance, commercially available from Itaconix under the trade name of Itaconix® DSP 2K™, and Itaconix® CHT121™.

Polymers

The antimicrobial cleaning composition may comprise an additional polymer. It has been found that the presence of a specific polymer as described herein, allows for better shine and to improve the residual antimicrobial efficacy of the composition on hard surfaces.

The polymer can be selected from the group consisting of: a vinylpyrrolidone homopolymer (PVP); a polyethyleneglycol dimethylether (DM-PEG); a vinylpyrrolidone/dialkylaminoalkyl acrylate or methacrylate copolymers; a polystyrenesulphonate polymer (PSS); a poly vinyl pyridine-N-oxide (PVNO); a polyvinylpyrrolidone/vinylimidazole copolymer (PVP-VI); a polyvinylpyrrolidone/polyacrylic acid copolymer (PVP-AA); a polyvinylpyrrolidone/vinylacetate copolymer (PVP-VA); a polyacrylic polymer or polyacrylicmaleic copolymer; a isobutylene/ethylmaleimide/hydroxyethylmaleimide co-polymer; a polyimide-1 polymer; vinylpyrrolidone/dimethylaminopropyl methacrylamide copolymer (VP-DMAPMA); VP/Dimethylaminoethylmethacrylate copolymer; polyethyleneimine; methylvinylether/maleic acid copolymer; alkylated polyvinylpyrrolidone; and mixtures thereof. Preferred polymers are selected from the group consisting of a polyvinylpyrrolidone/vinylacetate copolymer (PVP-VA) CAS #25086-89-9; a polyimide-1 polymer CAS #497926-97-3; a VP/Dimethylaminoethylmethacrylate copolymer CAS #30581-59-0; a methylvinyl ether/maleic acid copolymer CAS #25153-40-6; an alkylated polyvinylpyrrolidone polymer CAS #26160-96-3; and mixtures thereof. More preferred polymer is a methylvinyl ether/maleic acid copolymer. Typically, the antimicrobial cleaning composition may comprise from about 0.005% to about 5.0% by weight of the composition of said polymer, preferably from about 0.10% to about 4.0%, more preferably from about 0.1% to about 3.0% and most preferably from about 0.20% to about 1.0%.

Solvent

In addition to the 1,2-hexanediol, the composition of the present invention may comprise an additional solvent or a mixture thereof as an optional ingredient. Suitable solvent is selected from the group consisting of ethers and diethers having from 3 to 14 carbon atoms; glycols or alkoxylated glycols; alkoxylated aromatic alcohols; aromatic alcohols; alkoxylated aliphatic alcohols; aliphatic alcohols; C8-C14 alkyl and cycloalkyl hydrocarbons and halohydrocarbons; C6-C16 glycol ethers; terpenes; other diols; and mixtures thereof. Glycols such as propylene glycol and dipropyleneglycol; ethers such as n-butoxypropanol; glycol ethers such as dipropylene glycol n-butyl ether, diethyleneglycol monobutyl ether, propylene glycol phenyl ether, and ethyleneglycol monobutylether.

When present, the solvent can be present at a level of from about 0.1% to about 10%, or from about 0.2% to about 5%, or from about 0.5% to about 3% by weight of the composition. pH adjusting agents There is no limitation on the types of pH adjusting agents that can be added into the liquid composition of the present invention. Example of pH adjusting agents that can be used include, but are not limited to, triethanolamine, diethanolamine, monoethanolamine, sodium hydroxide, sodium carbonate, potassium hydroxide, potassium carbonate, calcium carbonate, citric acid, acetic acid, hydrochloric acid, sulfamic acid, sulfuric acid and the like. Particularly preferred pH adjusting agents are triethanolamine, monoethanolamine, sodium hydroxide, hydrochloric acid and citric acid.

Method of Cleaning a Surface

The composition of the invention is particularly suited for cleaning of inanimate surfaces preferably hard surfaces selected from the group consisting of ceramic, enamel, stainless steel, Inox®, Formica®, vinyl, no-wax vinyl, linoleum, melamine, glass, plastics and plastified wood, and combinations thereof. In particular, the compositions are particularly suited for reducing the microbial population, while leaving surfaces clean, shiny and grease free.

The compositions described herein can be used neat or can be achieved by diluting with water a concentrated composition prior to applying to the surface. In preferred methods, the composition is applied neat, more preferably, the hard surface cleaning composition is sprayed from an aerosol can or from a trigger spray bottle onto the hard surface.

The composition can be applied by any suitable means, including using a mop, sponge, cloth, paper towel, wipe, or other suitable implement.

The surface may be rinsed, preferably with clean water, in an optional further step, and also as a further step, wiped, such as with a cloth or a paper towel. However, rinsing is most often completely unnecessary given the low level of raw materials in the composition and the excellent shine end result and cleaning that is achieved in the absence of a rinse step. Excessive rinsing may also be deleterious with respect to the bactericidal and virucidal 24-hour protection provided by the compositions of the invention. Excessive wiping can also be counterproductive.

In another preferred embodiment of the present invention said method of cleaning an inanimate surface includes the steps of applying, preferably spraying, said composition onto said surface, leaving said composition to act onto said surface for a period of time with or without applying mechanical action, and optionally removing said composition, optionally removing said composition by rinsing said hard surface with water and/or wiping said hard surface with an appropriate implement, e.g., a sponge, a paper or cloth towel and the like. Such compositions are often referred to as "ready-to-use" compositions. In preferred methods, the surface is a hard surface. Preferably the surface is not rinsed after application of the antimicrobial composition. The composition of the present invention exhibits improved antimicrobial efficacy, good grease cleaning and/or streak-free shine.

Examples of preferred compositions for use herein include:

An antimicrobial composition comprising:

i) from about 0.25% to about 2% by weight of the composition of a modified alkylglucoside;
ii) from about 0.1% to about 3% by weight of the composition of a 1,2 alkanediol;
iii) from 0 to about 0.9% by weight of the composition of a polymer;
iv) preferably, at least 90% by weight of the composition water; and wherein the composition is substantially free of a quaternary ammonium compound.

An antimicrobial composition comprising:

i) from about 0.25% to about 2% by weight of the composition of a modified alkyl glycoside wherein the modified alkyl glycoside is selected from the group consisting of laurylglucosides hydroxypropylcitrate, laurylglucosides hydroxypropylsulfonate, decylglucosides hydroxypropylsulfonate, sorbitan esters and alkylglucoside polymer, sorbitan oleate decylglucoside polymer and a mixture thereof.
ii) from about 0.1% to about 3% by weight of the composition of a 1,2 alkanediol;
iii) from 0 to about 0.9% by weight of the composition of a polymer;
iv) from 0.01-0.5% by weight of the composition of a perfume;

v) preferably, at least 88% by weight of the composition water; and wherein the composition is substantially free of a quaternary ammonium compound.

An antimicrobial composition comprising:

i) from about 0.25% to about 1% by weight of the composition of a modified alkylglucoside;

ii) from about 0.25% to about 2% by weight of the composition of a 1,2 alkanediol iii) from 0 to about 0.7% by weight of the composition of a polymer iv) preferably, at least 95% by weight of the composition water; and wherein the composition is substantially free of a quaternary ammonium compound.

An antimicrobial composition comprising:

i) from about 0.25% to about 0.65% by weight of the composition of a modified alkyl polyglucoside;

ii) from about 0.1% to about 1.0% by weight of the composition of a 1,2 alkanediol selected from the group consisting of, 1,2-hexanediol, 1,2-heptanediol, 1,2-octanediol, 1,2-nonanediol, 1,2-decanediol, 1,2-undecanediol, 1,2-dodecanediol, and a mixture thereof;

iii) from 0 to about 0.3% by weight of the composition of a polymer;

iv) from 0 to about 0.5% of a solvent;

v) from 0.01 to about 0.5% of a perfume vi) preferably, at least 92% by weight of the composition water; and wherein the composition is substantially free of a quaternary ammonium compound.

An antimicrobial composition comprising:

i) from about 0.25% to about 0.65% by weight of the composition of a modified alkyl polyglucoside wherein the modified alkyl glycoside is selected from the group consisting of laurylglucosides hydroxypropylcitrate, laurylglucosides hydroxypropylsulfonate, decylglucosides hydroxypropylsulfonate, co-sorbitan esters and alkylglucoside polymer, sorbitan oleate decylglucoside polymer and a mixture thereof.

ii) from about 0.1% to about 1.0% by weight of the composition of 1,2-hexanediol;

iii) from 0 to about 0.3% by weight of the composition of a polymer;

iv) from 0 to about 0.5% by weight of the composition of a solvent;

v) from 0.1 to about 1% by weight of the composition of an additional surfactant;

vi) from 0.01 to about 0.5% by weight of the composition of a perfume;

vii) preferably, at least 90% by weight of the composition water; and wherein the composition is substantially free of a quaternary ammonium compound.

An antimicrobial composition comprising:

i) from about 0.25% to about 3% by weight of the composition of a modified alkyl glycoside wherein the modified alkyl glycoside is selected from the group consisting of laurylglucosides hydroxypropylcitrate, laurylglucosides hydroxypropylsulfonate, decylglucosides hydroxypropylsulfonate, sorbitan oleate decylglucoside polymer and a mixtures thereof;

ii) from about 0.1% to about 3.5% by weight of the composition of 1,2-hexanediol;

iii) from 0 to about 0.9% by weight of the composition of a polymer selected from the group consisting of a vinyl pyrrolidone/dimethylaminoethyl methacrylate copolymer, an alkylated polyvnylpyrrolidone, a polyvnylpyrrolidone/vinylacetate copolymer, a methylvinyl ether/maleic acid copolymer and mixtures thereof;

iv) from 0 to about 2% by weight of the composition of an additional surfactant selected from the group consisting of anionic surfactants, non-ionic surfactants and zwitterionic surfactants/10 v) from 0 to about 3% by weight of the composition of an additional solvent;

vi) from 0.01 to about 0.5% by weight of the composition of a perfume;

vii) preferably, at least 85% by weight of the composition water; and wherein the composition is substantially free of a quaternary ammonium compound.

An antimicrobial composition comprising:

i) from about 0.25% to about 5% by weight of the composition of a modified alkyl glycoside wherein the modified alkyl glycoside is selected from the group consisting of laurylglucosides hydroxypropylcitrate, laurylglucosides hydroxypropylsulfonate, decylglucosides hydroxypropylsulfonate, sorbitan oleate decylglucoside polymer and a mixtures thereof;

ii) from about 0.5% to about 5% by weight of the composition of a 1,2 alkanediol selected from the group consisting of 1,2-hexanediol, 1,2-octanediol, 1,2-decanediol and mixtures thereof;

iii) from 0 to about 4.5% by weight of the composition of a polymer selected from the group consisting of a vinyl pyrrolidone/dimethylaminoethyl methacrylate copolymer, an alkylated polyvnylpyrrolidone, a polyvnylpyrrolidone/vinylacetate copolymer, a methylvinyl ether/maleic acid copolymer and mixtures thereof;

iv) from 0 to about 3% by weight of the composition of an additional surfactant;

v) from 0 to about 5% by weight of the composition of a solvent;

vi) from 0.02 to about 0.8% by weight of the composition of a perfume;

vii) preferably, at least 70% by weight of the composition of water; and wherein the composition is substantially free of a quaternary ammonium compound.

EXAMPLES

Methods

Antimicrobial Efficacy in Suspension

The antimicrobial efficacy of the compositions of the present invention was measured in suspension against the gram-negative bacterium *Klebsiella pneumoniae* (*K. pneumoniae* ATCC #4352). The bacteria inoculum was prepared by transferring several colonies from a Tryptone Soy Agar (TSA) plate, inoculated 24 h prior to the test with bacteria from a glycerol stock kept at −80° C., to a saline solution (0.85% NaCl), the bacteria concentration in this saline solution was determined by measuring the % Transmittance at 425 nm and adjusted by either adding more bacteria or more saline solution until the % Transmittance at 425 nm was between 6.5-7.5%. This % transmittance corresponds to a bacteria concentration of $10^9$ CFU/ml. Once the desired concentration of bacteria was obtained, 5% of the bacteria suspension volume was removed and replaced by an equal volume of fetal bovine serum (FBS) soil—for a 10 mL inoculum, 500 μL of the bacteria suspension was removed and replaced by 500 μL of FBS. 90 μL of this bacteria preparation was added to 10 ml of each test product and incubated at room temperature for 5 minutes, a water control was prepared and treated in the same way. After this contact time, 100 μL of this product+bacteria solution was transferred to an eppendorf tube containing 900 μL of neutralizer solution (Modified Letheen Broth supplemented with 1.5% polysorbate 80) and mixed thoroughly by vortexing to stop the bactericidal effect of the test product, this solution was serially diluted in neutralizer and plated in TSA plates according to standard microbiology procedures. After 24 h incubation at 37° C. the colonies in the TSA plates were counted and the bacteria log reduction calculated based on the number of colonies counted from the water control treatment.

Residual Antimicrobial Efficacy on Hard Surfaces

The residual antimicrobial efficacy of the compositions of the present invention was measured against the gram-positive bacterium *Staphylococcus aureus* (*S. aureus* ATCC #6538) and the gram-negative bacterium *Klebsiella pneumoniae* (*K. pneumoniae* ATCC #4352) according to the EPA protocol #01-1A for residual self-sanitizing activity of dried chemical residues on hard, non-porous surfaces (RSS). The sanitizer test was performed at least 36 hours after initial product application onto the surface.

Neat Shine Test

The shine test was done by applying 0.225 mL of the ready-to-use antimicrobial composition diagonally on the surface of clean black glossy ceramic tile (20 cm×30 cm). Immediately after applying the product, the product was spread over the entire surface of the tile by wiping gently with a double folded Bounty paper towel (8 cm×10 cm folded into quarters). Wiping was done starting from the bottom left corner of the tile and covering the entire surface with ×6 wipes horizontally-back and forth, ×6 wipes vertically-up and down, and ×6 wipes horizontally-back and forth without lifting the paper. After allowing the tiles to dry for at least 20-30 minutes results were analyzed by using the grading scale described below.

Grading in Absolute Scale:

0=as new/no streaks and/or film
1=very slight streaks and/or film
2=slight streaks and/or film
3=slight to moderate streaks and/or film
4=moderate streaks and/or film
5=moderate/heavy streaks and/or film
6=heavy streaks and/or film Each tile was evaluated by at least 4 panelists.

Example 1—Residual 24 Hours Efficacy

The compositions shown in Table 1 were prepared and their residual antimicrobial efficacy was measured according to the EPA protocol #01-1A for residual self-sanitizing activity of dried chemical residues on hard, non-porous surfaces (RSS) against the gram-negative bacterium *Klebsiella pneumoniae* ATCC #4352, and the gram-positive bacterium *Staphylococcus aureus* ATCC #6538 as described in the Methods section. Compositions C1-C3 are comparative examples outside of the scope of the present invention, C1-C3 comprise a non-modified alkylpolyglucoside, an amine oxide surfactant, or a combination of both. Composition I1 is a compositions according to the present invention comprising the modified alkyl polyglucoside Suga®Boost 050 (Colonial Chemical).

The shine profile of tiles treated with inventive composition I1 and comparative compositions C1-C3 was evaluated according to the protocol described in the methods section Table 1 shows the residual antimicrobial efficacy on hard non-porous surface, and the shine performance of comparative compositions C1-C3 and of inventive compositions I1.

TABLE 1

| Compositions | C1 | C2 | C3 | I1 |
|---|---|---|---|---|
| 1,2-hexanediol | 2% | 2% | 2% | 1% |
| Suga ® Boost 050[1] | — | — | — | 1.75% |
| C8-C10 APG[2] | | 1.75% | 1% | |
| Decyl dimethyl amine oxide | 0.75% | — | — | — |
| C12-C14 dimethyl amine oxide | | — | 0.75% | — |
| Monoethanolamine | 0.5% | — | — | — |
| Polymer[3] | 0.925% | 0.65% | 0.65% | 0.6% |
| NaOH | To pH 8.26 | — | — | — |
| HCl | — | To pH 5.5 | To pH 5.5 | To pH 5.5 |
| Log Reduction *K. pneumoniae* | NT | 0 | 0 | NT |
| Log Reduction *S. aureus* | 0.59 | NT | NT | 2.45 |
| Shine visual score | 2.25 | 1.7 | 3.7 | 0.75 |

[1]Functionalized alkylpolyglucoside comprising a sorbitan alkyl polyglucoside polymer as described in WO2021/062404 (Colonial Chemical)
[2]Caprylyl-capryl oligoglucoside CAS Ref. 68515-73-1. Triton CG-110 (Dow)
[3]The following polymers were used:
C1: methyl vinyl ether/maleic acid copolymer CAS # 25153-40-6
C2: Vinylpyrrolidone dimethylaminoethylmethacrylate copolymer CAS # 30581-59-0
C3: Vinylpyrrolidone dimethylaminoethylmethacrylate copolymer CAS # 30581-59-0
I1: Vinylpyrrolidone dimethylaminoethylmethacrylate copolymer CAS # 30581-59-0
I2: 2-Pyrrolidinone, 1-ethenyl-, polymer with 1-butene CAS # 26160-96-3
I3: Polyimide polymer CAS # 497926-97-3
I4: Polyimide polymer CAS # 497926-97-3

Table 1 shows the shine performance and the 24 h long lasting antimicrobial efficacy of comparative compositions C1-C3 and inventive composition I1 against *K. pneumoniae* and *S. aureus* measured according to EPA RSS protocol. It can clearly be seen that inventive composition I1 comprising a 100% naturally-derived, PEG-free (1,4-Dioxane free), readily biodegradable and mild modified alkyl polyglucoside surfactant show better shine scores and better antimicrobial efficacy than comparative compositions C1-C3, even though inventive composition I1 comprises lower level of the antimicrobial active 1,2-hexanediol than said comparative compositions C1-C3.

Example 2—Efficacy in Suspension

Example 2 further illustrates the efficacy of compositions comprising 1,2-alkanediol and modified alkylpolyglucoside surfactants. The inventive compositions 12-16 shown in Table 2 were prepared. Tiles treated with inventive compositions I2-I6 were evaluated for shine according to the protocol described in the methods section. The antimicrobial efficacy of inventive compositions I2-I6 was measured in suspension against the gram-negative bacterium *Klebsiella pneumoniae*.

| Compositions | I2 | I3 | I4 | I5 | I6 |
|---|---|---|---|---|---|
| 1,2-hexanediol | 1% | 1% | 1% | 1% | 2% |
| 1,2-octanediol | — | — | — | 0.25% | — |
| Suga ® Boost 050 | 1% | 1% | 1% | 1.75% | — |
| Suga ® Nate[4] | — | 0.5% | — | — | — |
| PolySuga ® Mulse D9[5] | — | — | 0.5% | — | — |
| PolySuga ® Quat[6] | — | — | — | — | 1% |
| Suga ® Citrate[7] | — | — | — | — | — |
| Monoethanol amine | 0.5% | 0.5% | 0.5% | 0.5% | — |
| Polymer[8] | 1% | 1% | 1% | — | — |

-continued

| Compositions | I2 | I3 | I4 | I5 | I6 |
|---|---|---|---|---|---|
| NaOH | To pH 9.2 | To pH 9.2 | To pH 9.2 | To pH 9.2 | |
| HCl | | | | | To pH 5.5 |
| SHINE | NT | NT | NT | 0.6 | 0.6 |
| Log Reduction *K. pneumoniae* | Above 5.6 | Above 5.6 | Above 5.6 | Above 5.6 | Above 5.6 |

(4)Sodium Laurylglucosides Hydroxypropylsulfonate. CAS Ref. 742087-49-6. Colonial Chemical
(5)Sorbitan Oleate Decylglucoside polymer. CAS Ref. 1443994-56-6. Colonial Chemical
(6)PolySugaQuat L-1210P. Polyquaternium 80. CAS Ref. 1309865-14-2. Colonial Chemical
(7)Disodium Laurylglucosides Hydroxypropyl Citrate. CAS Ref. 2481100-10-9. Colonial Chemical
(8)2-Pyrrolidinone, 1-ethenyl-, polymer with 1-butene. CAS Ref. 26160-96-3

The data presented in Table 2 clearly shows that compositions of the present invention comprising different functionalized alkylpolyglucosides combined with different 1,2-alkanediols deliver very high antimicrobial efficacy and excellent shine.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

What is claimed is:

1. An antimicrobial composition comprising:

i) from about 1 to about 10% by weight of the composition of a modified alkyl glycoside comprising an alkyl glycoside and a modifying moiety wherein the modifying moiety comprises a functional group selected from the group consisting of sulfonate, carboxylate, glycinate, carboxymethyl, hydroxyalkyl and a mixture thereof; and/or wherein the modified alkyl glycoside is a sorbitan alkyl glucoside polymer;

ii) a 1,2-alkanediol having from 6 to 12 carbon atoms; and iii) a polymer wherein the polymer is selected from the group consisting of a polyvinylpyrrolidone/vinylacetate copolymer, a polyimide-1 polymer, a vinylpyrrolidone/dimethylaminoethylmethacrylate copolymer, a methylvinyl ether/maleic acid copolymer, an alkylated polyvinylpyrrolidone polymer and a mixture thereof;

with the proviso that the modified alkyl glycoside is not hydroxypropylsulfonate laurylglucoside cross polymer.

2. A composition according to claim 1 wherein the 1,2 alkanediol is selected from the group consisting of, 1,2-hexanediol, 1,2-heptanediol, 1,2-octanediol, 1,2-nonanediol, 1,2-decanediol, 1,2-undecanediol, 1,2-dodecanediol, and a mixture thereof.

3. A composition according to claim 1 wherein the 1,2 alkanediol is selected from the group consisting of 1,2-hexanediol, 1,2-octanediol and mixtures thereof.

4. A composition according to claim 1 comprising 1,2-hexanediol and 1,2-octanediol in a 1:2 to 1:4 weight ratio.

5. A composition according to claim 1 comprising from about 1.5% to about 5% by weight of the composition of a 1,2 alkanediol.

6. A composition according to claim 1 wherein modifying moiety comprises a hydroxyalkyl, wherein the hydroxyalkyl is selected from the group consisting of hydroxymethyl, hydroxyethyl, hydroxypropyl and a mixture thereof.

7. A composition according to claim 1 wherein the modified alkyl glycoside is selected from the group consisting of laurylglucoside hydroxypropylcitrate, laurylglucoside hydroxypropylsulfonate, decylglucoside hydroxypropylsulfonate, sorbitan ester and alkylglucoside polymer, sorbitan oleate decylglucoside polymer and a mixture thereof.

8. A composition according to claim 1 comprising from about 2% to about 8% by weight of the composition of the modified alkyl glycoside.

9. A composition according to claim 1 wherein the composition comprises 1,2-hexanediol and wherein the modified alkyl glycoside is selected from the group consisting of laurylglucoside hydroxypropylsulfonate, decylglucoside hydroxypropylsulfonate, sorbitan oleate decylglucoside polymer and a mixture thereof.

10. A composition according to claim 1 comprising the modified alkyl glycoside and the 1,2 alkanediol in a weight ratio of from about 1:3 to about 3:1.

11. A composition according to claim 1 further comprising an additional surfactant.

12. A composition according to claim 1 further comprising an additional solvent.

13. A composition according to claim 1 further comprising a fragrance.

14. A composition according to claim 1 wherein the composition is substantially free of a quaternary ammonium compound.

15. A composition according to claim 1 wherein in the composition is a liquid composition.

16. A method to provide residual biocidal activity to an inanimate surface wherein residual biocidal activity is measured according to the US EPA protocol #01-1A wherein the method comprises the step of applying a composition comprising a modified alkyl glycoside and a 1,2 alkanediol wherein the modified alkyl glycoside:

i) comprises an alkyl glycoside and a modifying moiety wherein the modifying moiety comprises a functional group selected from the group consisting of sulfonate, carboxylate, sulfosuccinate, glycinate, carboxymethyl, hydroxyalkyl and a mixture thereof; and/or ii) wherein the modified alkyl glycoside is a sorbitan alkyl glucoside polymer; and wherein the composition further comprises a polymer wherein the polymer is selected from the group consisting of a polyvinylpyrrolidone/vinylacetate copolymer, a polyimide-1 polymer, a vinylpyrrolidone/dimethylaminoethylmethacrylate copolymer, a methylvinyl ether/maleic acid copolymer, an alkylated polyvinylpyrrolidone polymer and a mixture thereof.

* * * * *